United States Patent [19]

Davidson, Jr. et al.

[11] 4,025,724

[45] May 24, 1977

[54] NOISE CANCELLATION APPARATUS

[75] Inventors: Allen R. Davidson, Jr., Bowie; Timothy G. F. Robinson, Severna Park, both of Md.

[73] Assignee: Westinghouse Electric Corporation, Pittsburgh, Pa.

[22] Filed: Aug. 12, 1975

[21] Appl. No.: 603,978

[52] U.S. Cl. .............................. 179/1 P; 181/33 L

[51] Int. Cl.$^2$ .............................. H04B 15/00

[58] Field of Search ............... 179/1 P, 1 VC, 1 FS; 181/33 C, 33 L

[56] References Cited

UNITED STATES PATENTS

| | | | |
|---|---|---|---|
| 2,743,314 | 4/1956 | Jeanlin | 179/1 FS |
| 2,776,020 | 1/1957 | Conover | 179/1 P |
| 2,964,272 | 12/1960 | Olson | 181/33 L |
| 3,071,752 | 1/1963 | Strasberg | 181/33 L |
| 3,922,488 | 11/1975 | Gaber | 179/1 FS |

FOREIGN PATENTS OR APPLICATIONS

| | | | |
|---|---|---|---|
| 198,004 | 9/1967 | U.S.S.R. | 179/1 P |

*Primary Examiner*—Kathleen H. Claffy
*Assistant Examiner*—E. S. Kemeny
*Attorney, Agent, or Firm*—D. Schron

[57] ABSTRACT

An array of independent sound cancellation units is arranged over a vibrating noise generating surface. Each unit includes an arrangement of acoustic transducers (sensors) positioned adjacent the surface to obtain an electrical average of the local acoustic noise generated by a predetermined zone of the surface. The summed average is changed in phase and gain by an active filter whose output drives an acoustic projector also positioned adjacent the surface and the acoustic output of which sums with the original noise signal in the acoustic far field, thus tending to cancel the noise. In essence, each vibrating surface zone and its associated sound cancellation unit tend to form an acoustic doublet. A signal indicative of the projector output is used as a feedback signal, with appropriate time delays, to cancel the effect of the projected output signal being picked up by the unit's transducers, and to cancel the effect of the output of other projectors of the array.

18 Claims, 6 Drawing Figures

NOISE CANCELLATION APPARATUS

BACKGROUND OF THE INVENTION

1. Field of the Invention:

The invention in general relates to sound cancellation apparatus and more particularly to the cancellation of relatively low frequency sounds from large surfaces.

2. Description of the Prior Art:

Any object that vibrates and disturbs its surrounding ambient medium may become an acoustic source by radiating acoustic waves which vary in wavelength ($\lambda$) according to their frequency. Very often, the vibration is unwanted and is a source of acoustic noise. Such noise may be radiated for example from reverberating structures, vibrating machinery, large transformers and various other types of apparatus in various ambient mediums.

The most direct means for reducing the sound intensity from a typical acoustic source is to surround the source with an acoustic baffle which cuts off its direct acoustic propagation path. Various absorbing materials exist which have the ability to dissipate sound energy by converting it to heat energy. Such absorbers work well for the high frequency range, however, they are extremely bulky and limited in application for the low frequency range.

Another type of noise cancellation arrangement employs a microphone, amplifier and loudspeaker to measure the noise in a local area relatively distant from the source and to produce equal amplitude and opposite phase acoustic signals to cancel out the sound in the area. Although a significant sound reduction is experienced, it is experienced only for that particular area and not other areas where the sound may be equally objectionable. In addition, such an arrangement is prone to the production of interference patterns which even increase the noise intensity in other locations.

Another type of similar arrangement which achieved limited results placed the microphone very close to an acoustic noise source which approximated a point source. The signal processing circuit for such an arrangement produced a phase opposition signal which was adjustable by suitably adjusting the distance between the microphone and loudspeaker. The limited results obtained with such apparatus, restricted to a point source of acoustic radiation and a single frequency are not applicable to large vibrating surfaces which may be vibrating in a complex mode to produce a wide spectrum of frequencies.

Still another arrangement attempted to use an array of several speakers located near large outdoor transformers with each speaker being electrically tuned from a variable frequency source to reduce single frequency audible signals emitted from the transformers. Although results showed some attenuation for single frequencies over long distances with finite directional angles, the apparatus actually produced intensified sound in other directions. Furthermore the apparatus was very restrictive in regards to operational bandwidth.

SUMMARY OF THE INVENTION

In accordance with the present invention apparatus is provided for substantially reducing, if not effectively cancelling, acoustic noise radiated by a surface.

An array of sound cancellation units is arranged adjacent the surface with each unit including transducer means operable to provide a resulting output signal indicative of the acoustic noise generated by a predetermined zone of the surface. The transducer means may be positioned at any chosen location ranging from the surface itself to a position less than approximately one-third $\lambda_m$ from the surface, where $\lambda_m$ is the wavelength of the highest frequency of interest to be cancelled. Effectiveness of the sound cancellation array, however, is improved as the units are located as close as possible to the vibrating surface within the electrical and mechanical restrictions so determined during actual application design. In theory, each vibrating surface zone and its associated cancellation unit, form an approximate acoustic dipole whose overall radiation pattern intensity is considerably reduced from the original radiation pattern intensity from the vibrating surface zone alone.

The strength of the dipole radiation pattern is therefore a linear function of the acoustic distance between the virtual source (vibrating surface) and the virtual sink (cancellation unit). Hence, the shorter the distance between the vibrating surface and transducer, the smaller the intensity of the acoustic dipole and therefore the better the vibrating surface and cancellation unit form an acoustic doublet, i.e., far field sound cancellation.

A signal conditioning circuit is provided for inverting the signal by 180° and modifying its gain and phase characteristics, with the modified signal then being provided to an acoustic projector which produces an output acoustic signal corrected in phase and gain which will cancel that portion of the total far field signal associated with the predetermined radiating zone on the surface.

Circuit means are further provided for reducing the effects of acoustical feedback from the projector to the transducer means, and from other projectors of the array.

DESCRIPTION OF THE PREFERRED EMBODIMENT

Figure 1:
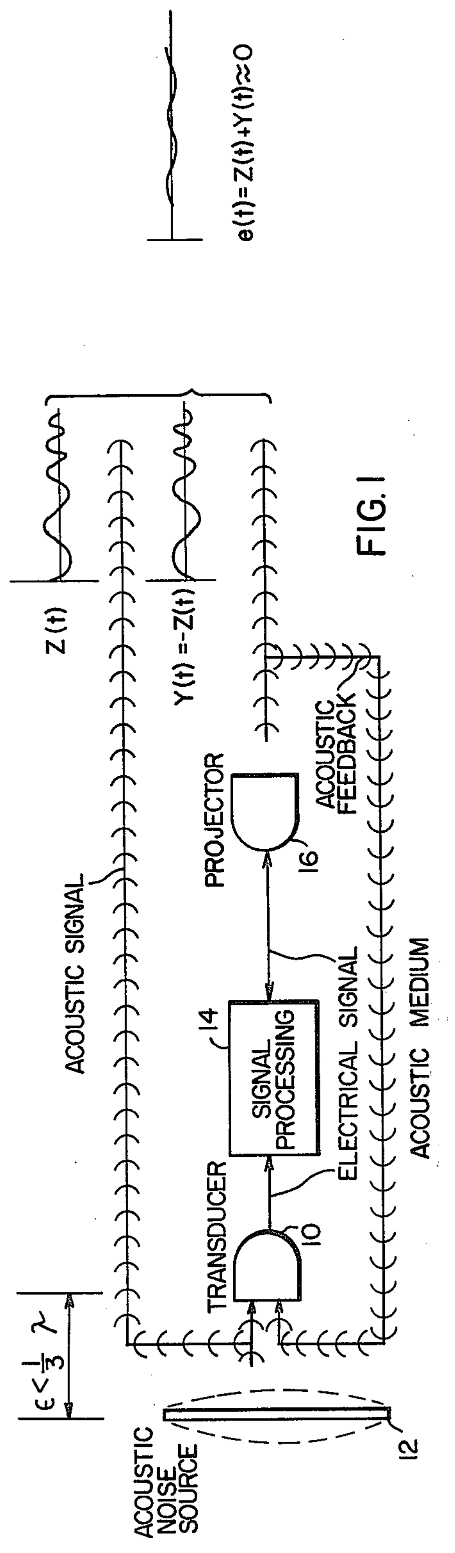
FIG. 1 is a block diagram illustrating the basic principles of operation of the present invention.

Referring now to FIG. 1, there is illustrated the basic concept of the active sound cancellation unit in accordance with the present invention. Transducer means in the form of an array of one or more transducers 10 is positioned adjacent an acoustic noise source in the form of vibrating surface 12 which may be a portion of a larger surface. The transducer 10 is spaced at a distance $\epsilon$ from the vibrating surface 12, where $\epsilon$ may range from 0, in which case the transducer would be mounted directly on the vibrating surface, to a maximum distance of approximately one-third $\lambda_m$ where $\lambda_m$ is the wavelength of the highest frequency of interest to be cancelled from the vibrating surface. The transducer 10 detects the acoustic signal and provides an electrical signal indicative thereof to the signal processing circuit 14 which conditions the signal prior to begin provided to acoustic projector 16. The conditioning of the signal includes a 180° phase inversion and a phase and gain correction so that projector 16 will project a far field signal corrected in both phase and gain which will cancel that portion of the far field signal associated with the acoustic noise producing surface 12.

The acoustic output from projector 16, however, feeds back through the acoustic medium into transducer 10 and accordingly the signal processing includes the elimination of the effect of this feedback. This is effectively accomplished by containing an electrical signal indicative of the projector feedback and cancelling it from the transducer output so that the signal operated upon by the signal processing network 14 is substantially only that provided by the surface 12.

Accordingly, if the signal projected by the surface 12 into the acoustic far field is $Z(t)$ the arrangement is such that projector 16 provides an acoustic signal $Y(t) = -Z(t)$ whereby in the far field a resultant signal $e(t)$ is produced where $e(t) = Z(t) + Y(t) \approx 0$.

Figure 2:
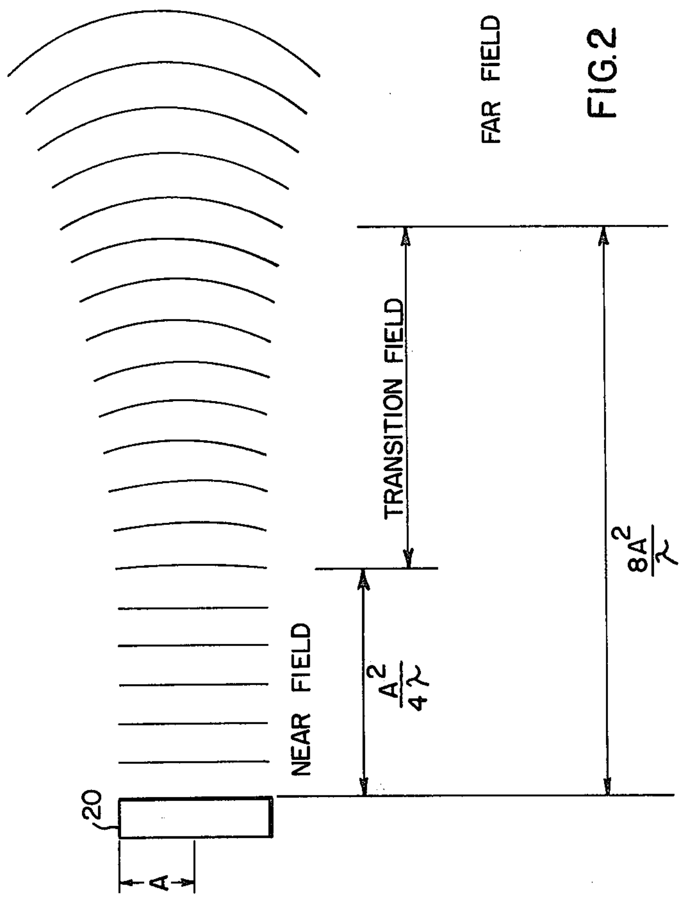
FIG. 2 is a diagram illustrating the near field and far field for an acoustic source.

In the ensuing description reference will be made to both near field and far field considerations. Very basically, the near field is the acoustic radiation field that is very close to the acoustic source and is loosely defined by a variety of different equations, utilized in the field of acoustics. With reference to FIG. 2, numeral 20 represents an acoustic source in the form of a piston of radius A. According to one theory, the near field extends from the surface of piston 20 out to a distance of $A^2/4\lambda$ where $\lambda$ is the operating wavelength and where $\lambda_m$ in the present discussion represents the wavelength of the highest frequency of interest to be cancelled. The far field is believed to commence at a distance of $8A^2/\lambda$ with the area between the termination of the near field and commencement of the far field representing the transition field.

In the far field the energy spreads out, with the acoustic wave being essentially spherical and governed by the simple spreading law where the acoustic pressure is inversely proportional to distance from the source. The simple laws dominating the far field, however, are not applicable to the wave in the near field, wherein the wave is goverened by complex equations. With the present invention the signal processing includes an active network for applying phase and gain corrections to compensate for acoustic near field measurements which are not the same as those assumed for far field measurements so that the acoustic outputs from the projector and the zone of the acoustic noise source cancel each other out in the acoustic far field.

Figure 3:
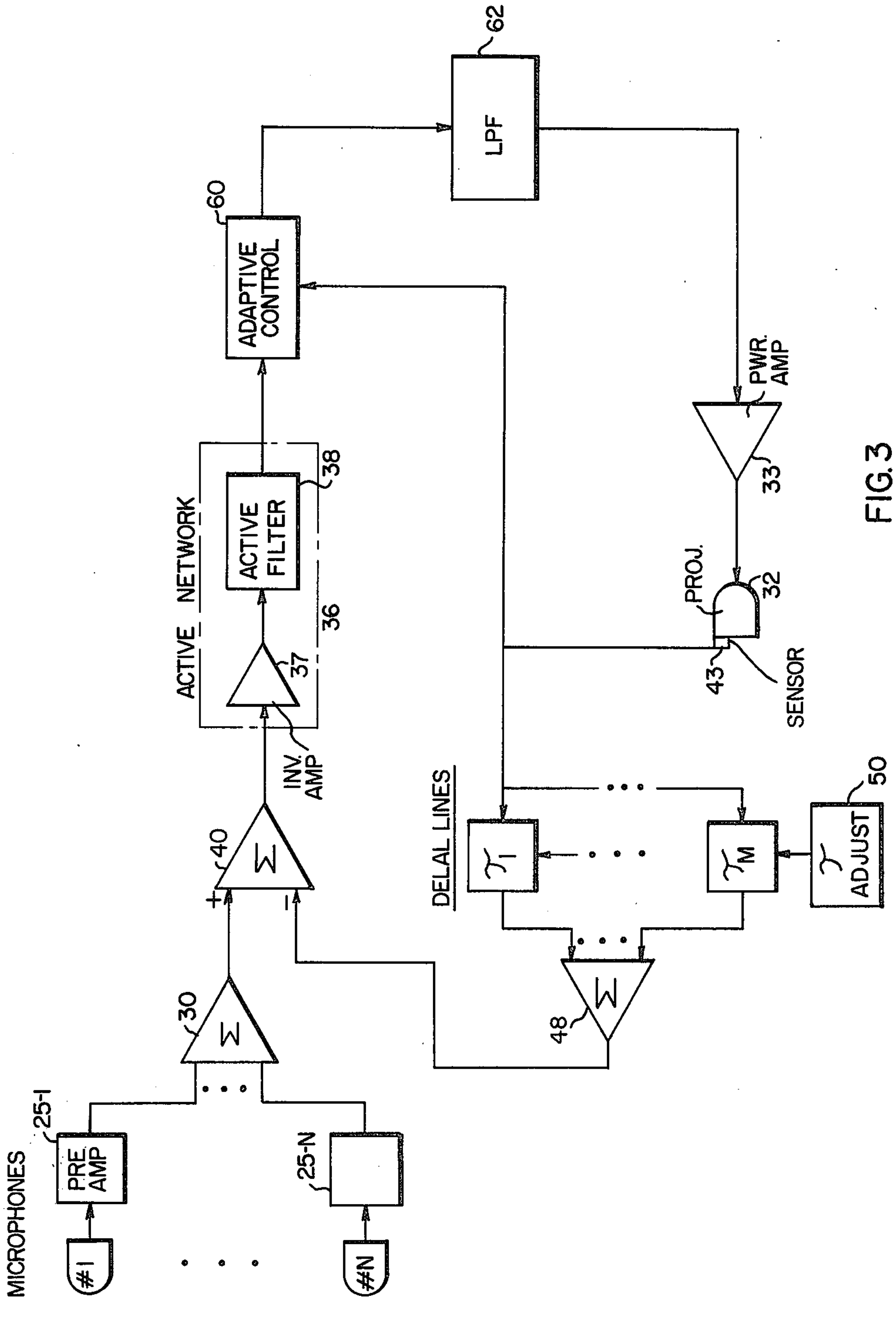
FIG. 3 is a block diagram illustrating an embodiment of the present invention.

A single cancellation unit in accordance with the present invention is illustrated in block diagram form in FIG. 3.

Each cancellation unit includes an arrangement of one or more transducers positioned adjacent a predetermined zone of a surface radiating acoustic noise. The transducers are operable to detect the acoustical pressures emitted from the vibrating surface and to transform these pressures into related electrical signals. The type of transducers utilized will depend upon the acoustic medium in which the apparatus is utilized and, by way of example, FIG. 3 illustrates the transducers as a plurality of microphones 1 to N each having an associated preamplifier 25-1 to 25-N with the microphones being closely matched in operating characteristics.

The electrical output of the microphone array is summed by means of a summing amplifier 30 operable to provide an output signal which is the average of the local noise adjacent a predetermined zone of the vibrating surface. This signal is eventually applied to the acoustic projector 32 which, for an ambient medium of air, may be an electromechanical loudspeaker driven by a power amplifier 33. Prior to being provided to the projector, however, the averaged signal from the microphones is conditioned or modified by an active network 36 which includes an inverting amplifier 37 operable to shift the phase of the input signal by 180°, and an active filter which modifies the signal's phase and gain to compensate for the measurement of sound in the near field for cancellation of noise in the far field.

In order to insure that sound cancellation is effective over a relatively wide bandwidth and that the cancellation unit can operate in a stable mode, the effects of acoustic feedback from the projector 32 to the microphones 1 to N are substantially reduced. This is accomplished by a feedback arrangement which includes a sensor for obtaining a signal indicative of the output of projector 32 which output, after a predetermined transit time depending upon the acoustic medium, is picked up by the microphone array such that the output of summing amplifier 30 includes not only a component indicative of the acoustic noise from the surface but also includes a component indicative of its own projector's output. Where more than one cancellation unit is provided in an array, the output of summing amplifier 30 will include additional components indicative of the outputs of neighboring projectors. Therefore, in order to eliminate the effects of not only self-feedback but array interaction, the projector output indication, (properly delayed) is subtracted in differential summing amplifier 40 from the averaged microphone outputs provided by summing amplifier 30.

Since it takes a finite time for the acoustic signal to arrive at the microphones, a plurality of delay lines are provided to insure that the signal to be subtracted arrives at the differential summing amplifier 40 at the proper time. Separate delay lines of the group designated $\tau_1$ to $\tau_m$ may be provided for each microphone utilized, however, if the microphones are disposed in a symmetrical array around the projector, only one delay line need be used for self feedback cancellation. The remaining delay lines have correspondingly different time delays based upon acoustic travel times from neighboring projectors to the microphones.

In one embodiment, identification of the projector feedback signal may be accomplished by a sensing means in the form of an accelerometer 43 mounted on the projector 32 and the electrical output of which is linearly proportional to the acoustical output of the projector. The accelerometer output signal is provided to the various time delay circuits $\tau_1$ to $\tau_m$, the outputs of which are summed together in summing amplifier 48, the output of which is an acoustic delay compensation signal which, when substrated from the averaged microphone signal from summing amplifier 30, eliminates the phase and gain error of the far field cancellation signal due to acoustic interactions among the cancellation units of the array, and self-feedback of the cancellation unit itself.

The theoretical number of delay lines required would be the number of microphones N times the number of cancellation units in the array. However, the required number of delay lines can be significantly reduced by symmetrically arranging the microphones around the projector and by utilizing symmetrical arrays of sound cancellation units. In addition, if a reduction in sound cancellation effectiveness at higher frequencies can be tolerated, only those delay lines associated with delay times from immediately adjacent cancellation units need be utilized.

Since the speed of sound may vary in an acoustic medium in accordance with various parameters, the time delay circuits $\tau_1$ to $\tau_m$ may be made adjustable to take into account the variation in speed of sound. In order to accomplish this, a time delay adjustment circuit 50 is provided and may be manually operated or may automatically measure various parameters affecting sound velocity and adjust the time delays accordingly.

As an alternative, elimination of feedback effects may be accomplished by employing accelerometers as the transducers mounted directly on the vibrating surface.

In order to insure that the projector provides an optimum linear sound cancellation signal within the electromechanical limits of the unit, there is provided an adaptive control network 60 which is responsive to the projector output by way of the electrical signal provided by accelerometer 43, to further change the phase and gain of the conditioned signal provided by the active network 36.

The adaptive control network 60 senses when the electromechanical linear limits of the unit are being exceeded and automatically changes the gain and/or phase of the modified signal to optimize performance of the cancellation unit. By way of example, if the accelerometer signal indicates that the signal intensity exceeds the linear range of the projector, the adaptive control network will effect an automatic gain reduction. In addition to adaptive control of the forward gain, the adaptive control network 60 may also correct phase-gain errors that may be created by microphone resonance or projector operation. Such networks for changing certain parameters of the system, such as adaptive gain control or adaptive frequency shifting, which optimizes system performance for changes in inputs and/or system parameters, are well known to those skilled in the art.

If the vibrational characteristics of the acoustic noise surface are known and stationary, the adaptive control network 60 may not be essential. If provided, its output signal is low pass filtered in low pass filter 62 in order to restrict the operational bandwidth of the sound cancellation unit to low frequencies. If the adaptive control network 60 is eliminated, the low pass filter 62 receives the modified signal directly from active network 36.

Figure 4A:
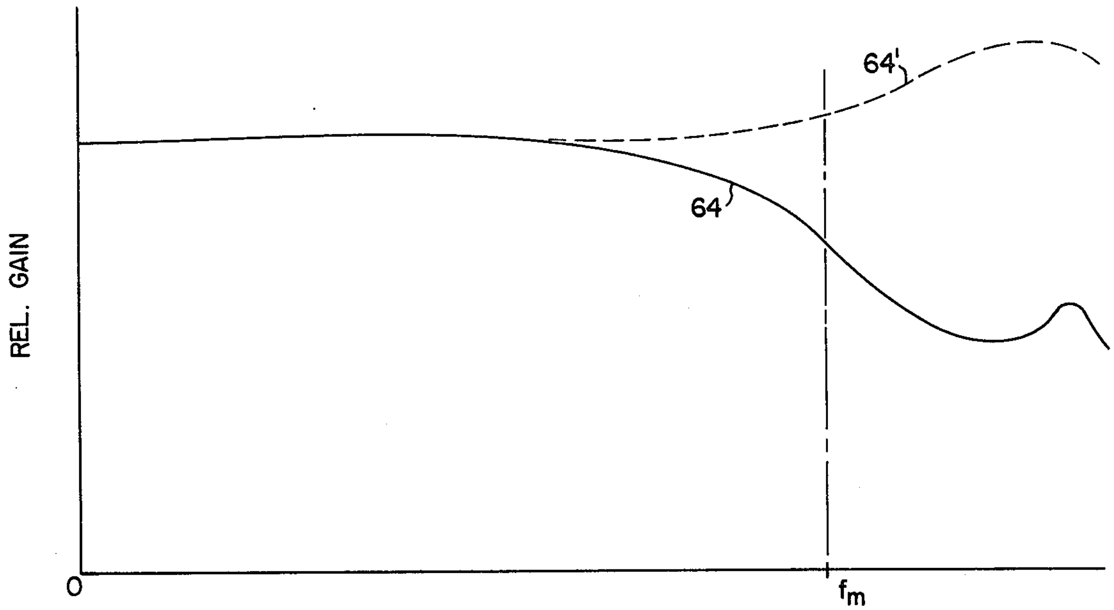
FIGS. 4A and 4B are relative gain and phase curves respectively to aid in the design of the active filter illustrated in FIGS. 3.

As was previously stated, the laws governing the signal in the far field are different from the governing laws for the signal prior to the far field and compensation must be made for these differences. The active network 36, and more particularly, the active filter 38, provides such compensation. For example, and with reference to FIG. 4A, the solid line curve 64 represents the gain of the pressure signal at the transducer array relative to the far field pressure signal as a function of frequency where $f_m$ is the highest frequency of interest to be cancelled. Having this relationship, an active filter is synthesized having a characteristic transfer function which approximates the inverse of the relative gain curve. The filter characteristic curve as a function of frequency, therefore, is the dotted line curve 64' which coincides with the relative gain curve 64 at the lower frequencies of the scale. Accordingly, as the relative gain decreases as the maximum frequency $f_m$ is approached, the active filter 38 applies more gain for compensation purposes.

Figure 4B:
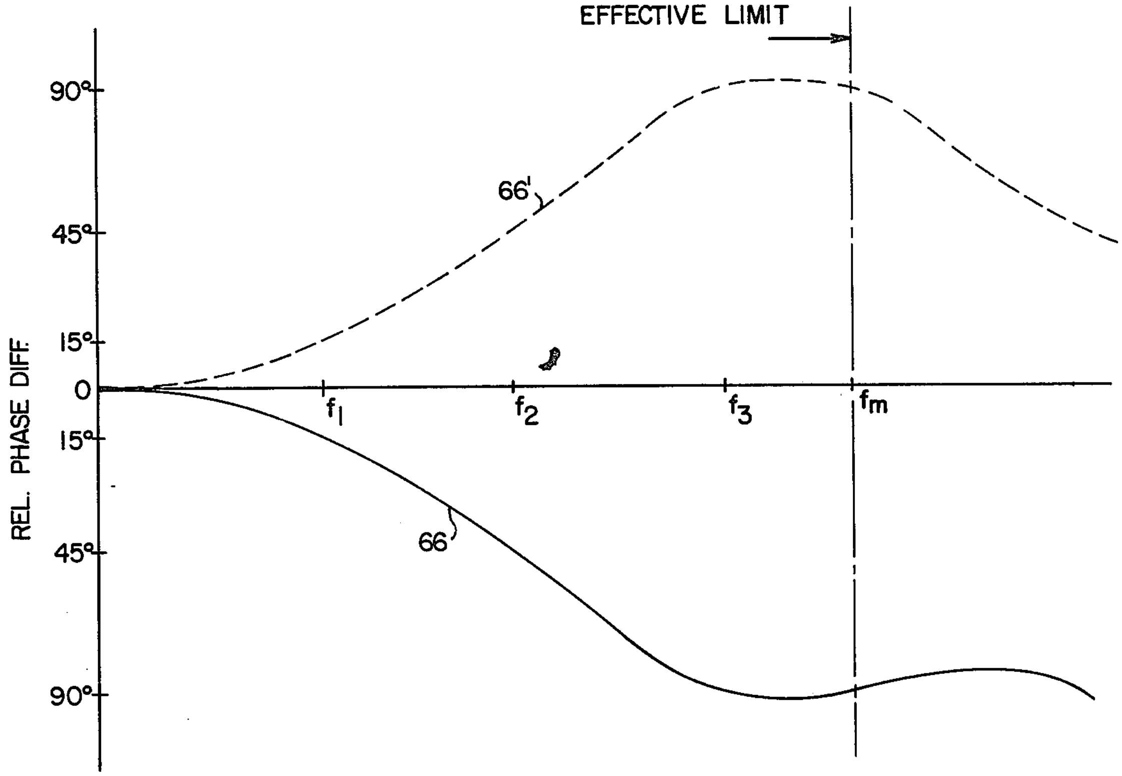

Curve 66 in FIG. 4B represents, as a function of frequency, the phase of the pressure signal at the point of measurement relative to that in the far field, less phase shift due to propagation delay. Suppose by way of example that the relative phase difference at a frequency $f_1$ is $-15°$, at a frequency $f_2$, $-45°$, and at a frequency $f_3$, $-90°$, the active filter 38 would be designed with the inverse characteristics as illustrated by the dotted line curve 66', such that the phase difference at these corresponding frequencies would be $+15°$, $+45°$ and $+90°$ respectively. It should be noted that the effect of distance (which is known and can be cancelled out) has no bearing on the plots of the relative gain or relative phase difference values.

The effective bandwidth limit of the filter is determined by the size of the predetermined vibrating zone. Above the effective limit the higher frequencies are not as effectively cancelled and accordingly the low pass filter 62 is designed to filter out these higher frequencies. Alternatively, the function of filter 62 may be designed into the active filter 38.

The technique for determining the active filter can be done theoretically utilizing well-known pressure equations governing an acoustic wave in the near and far field. Alternatively, such design may be done experimentally by, for example, measuring the pressure signal at a fixed point in the far field generated by a surface vibrating at a single frequency and whose size is geometrically the same as the zone of responsibility for a cancellation unit. The far field point may be determined from the formula illustrated in FIG. 2 where the term A would be equal to the radius of a circle whose area is the same as the zone of responsibility and $\lambda_m$ the wavelength of the highest frequency of interest to be cancelled. The pressure signal is then measured at the location of the transducer array fixed in position over the same vibrating surface as it would be in actual installation at the same frequency. The amplitude and phase of the signals from these two steps are compared and a relative phase and gain plot for a range of frequencies within the bandwidth of interest may be obtained by taking measurements at those other frequencies. The active filter may then be synthesized with a characteristics transfer function approximating the inverse of the phase-gain plot.

Figure 5:
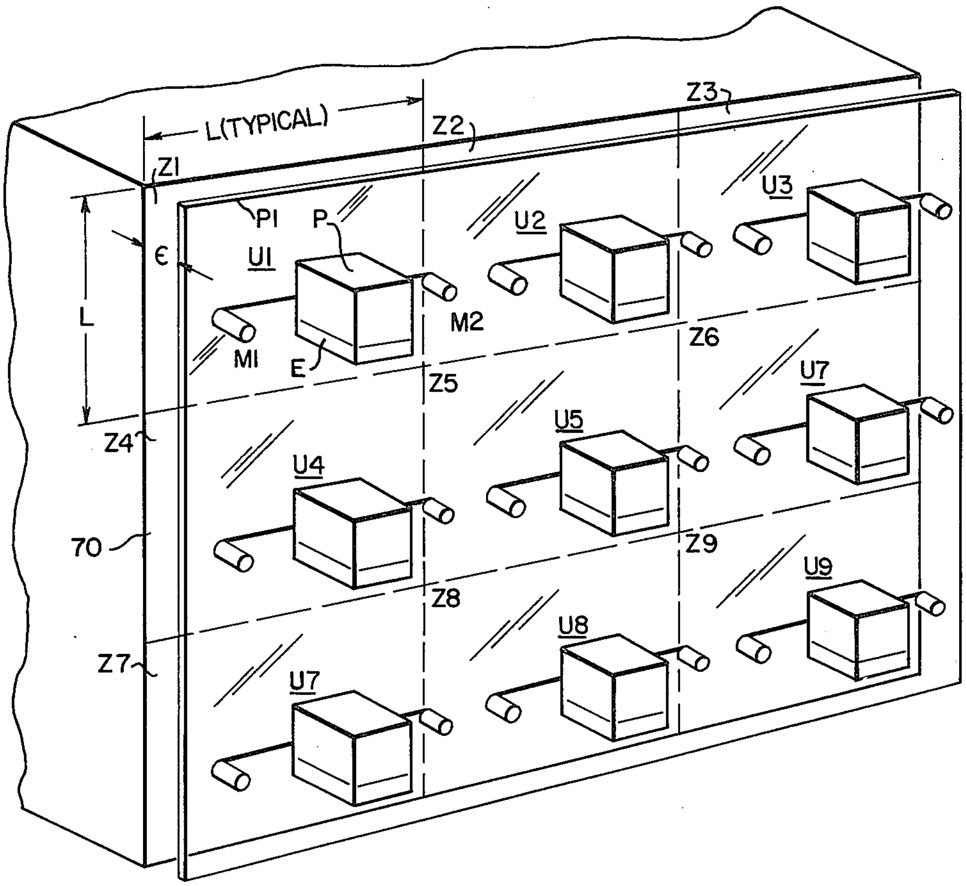
FIG. 5 illustrates an array of the units of FIG. 3 disposed adjacent an acoustic noise source.

The active cancellation apparatus of the present invention is composed of an array of one or more previously described cancellation units positioned adjacent a predetermined zone of a vibrating surface. By way of example, FIG. 5 illustrates an array of 9 independently operating cancellation units U1 to U9 positioned adjacent a vibrating acoustic noise radiating surface 70 of a structure 71. The units U1 to U9 are positioned adjacent respective zones of responsibility Z1 to Z9 and each unit includes, by way of example, two microphones M1 and M2, an acoustic projector structure P, which may be a loudspeaker and an electronics section E. The units are positioned by means of a support structure (not shown) with the microphones and the virtual point source of the projectors all lying on a common plane P1 located at a distance $\epsilon$ from the surface 70 where $\epsilon$ has a value from 0 to a maximum of approximately one-third $\lambda_m$, $\lambda_m$ being the wavelength of the highest frequency of interest to be cancelled.

In the field of acoustics, an acoustic doublet refers to an acoustic point source which radiates omnidirectionally and an acoustic sink, with an infinitesimal distance between the two such that there is no detectable radiated acoustic energy. The present invention approaches a simulation of an acoustic doublet with the zones on the radiating surface being analogous to point sources and the cancellation units being analogous to the acoustic sinks. In reality, however, each zone is not an omnidirectionally radiating point source nor is a cancellation unit an acoustic point sink, for all frequencies, however, the signal processing circuitry tends to compensate for the less than perfect analogy within the effective bandwidth. Further, in order to preserve the assumption of omnidirectionality, the spacing between adjacent cancellation units should be approximately equal to or less than one-third $\lambda_m$, thereby defining the area of the zone of responsibility. Ideally, cancellation units should be positioned as close as possible to the vibrating surface 70 and the greater the number of cancellation units, the greater the cancellation effect will be in the far field over a wider bandwidth. The location of the far field may be determined from the formula given in FIG. 2 by equating the area ($L^2$) of a zone of responsibility equal to the piston area $\pi A^2$ (FIG. 2).

By way of example let it be assumed that $f_m$ radiated by surface 70 is 240Hz. $\lambda_m$ therefore, for an ambient medium of air, would be approximately 4.7 feet and one-third $\lambda_m$, 1.56 feet.

The horizontal and vertical distance between adjacent cancellation units (as measured from the projectors virtual point source) may then be chosen to be approximately 1.56 feet or less, thus defining the area of the zone of responsibility.

$\epsilon$ may be chosen to be a maximum of 1.56 feet, however, bearing in mind that the smaller the value of $\epsilon$, the better will be the effective cancellation, not only for $f_m$ but for other radiated frequencies within the effective bandwidth of the apparatus.

Accordingly, there has been provided an arrangement which includes the measurement of sound in the near field and projecting it in phase opposition as a far field cancellation pattern. Sound cancellation is accomplished over a relatively wide bandwidth and the signal processing circuitry for accomplishing this includes, for frequencies near the upper end of the bandwidth, near field-far field signal compensation and array reverberation elimination. The compensation is accomplished by means of an active network whose transfer function approximates the inverse phase-gain characteristics of sound measurement in the near field relative to the far field, from a finite vibrating surface (the zone of responsibility). This transfer function approximation is valid for frequencies whose wavelengths are longer than the dimension of the zone of responsibility, which is limited to a maximum dimension L of approximately one-third $\lambda_m$.

The second type of upper band signal processing involves cancellation of the acoustical multipath feedback of projector output with multiple delayed outputs of the accelerometer signal. It is to be noted that the lower end of the noise cancellation bandwidth is limited by the mechanical resonant frequency of the projector which, if desired, may be changed such as by electrical compensation, to widen the effective bandwidth.

We claim as our invention:

1. Apparatus for cancelling acoustic noise radiated by a surface, comprising at least one sound cancellation unit said unit including:

A. transducer means operable to provide an output signal indicative of said acoustic noise generated by a predetermined zone of said surface and positioned less than approximately one-third $\lambda_m$ from said surface, where $\lambda_m$ is the wavelength of the highest frequency of interest to be cancelled;

B. projector means operable to provide an acoustic output signal in response to an input signal;

C. a signal conditioning network for 180° phase shifting said output signal of said transducer means and for providing a modified signal to said projector means; and D. circuit means for reducing the effects of acoustical feedback from said projector means to said transducer means.

2. Apparatus according to claim 1 wherein:

A. said apparatus includes a plurality of said units.

3. Apparatus according to claim 2 wherein:

A. said circuit means is additionally operable to reduce the effects of acoustic interaction between the projector means of one unit and the transducer means of another unit.

4. Apparatus according to claim 2 wherein:

A. the spacing between adjacent units is less than one-third $\lambda_m$.

5. Apparatus according to claim 1 wherein:

A. said circuit means includes sensor means positioned relative to said projector means and operable to provide a feedback signal indicative of said acoustic output signal; and further includes B. signal delay means for delaying said feedback signal by a predetermined amount; and C. means for subtracting said delayed feedback signal from said output signal of said transducer means.

6. Apparatus according to claim 5 wherein:

A. said sensor means is an accelerometer connected to said projector means.

7. Apparatus according to claim 5 wherein:

A. said apparatus includes a plurality of said units; and

B. said signal delay means includes a plurality of delay lines with respectively different delay times.

8. Apparatus according to claim 5 which includes

A. means for adjusting said delay as a function of predetermined parameters governing the speed of sound in the ambient medium.

9. Apparatus according to claim 1 wherein:

A. said transducer means includes a plurality of transducers.

10. Apparatus according to claim 9 wherein:

A. said plurality of transducers are symmetrically positioned about said projector means.

11. Apparatus according to claim 10 wherein:

A. said transducers are microphones.

12. Apparatus according to claim 11 wherein:

A. said projector means includes an electromechanical loudspeaker.

13. Apparatus according to claim 1 wherein:

A. said signal conditioning network includes an inverting amplifier and an active filter for modifying, as a function of frequency, the phase and gain characteristics of said output signal of said transducer means.

14. Apparatus according to claim 1 which includes

A. a low pass filter in circuit between said signal conditioning network and said projector means to restrict the operational bandwith of said unit to a predetermined value.

15. Apparatus according to claim 5 which includes

A. an adaptive control network operable to further modify said modified signal in response to said feedback signal.

16. Apparatus for cancelling acoustic noise radiated by a surface, comprising an array of sound cancellation units each said unit including:

A. means adjacent a predetermined zone of said surface for measuring the acoustic pressures emitted by said surface and to transform said pressures into an electric signal;

B. projector means responsive to said signals for transmitting a far field acoustic cancellation signal;

C. means for applying phase and gain corrections to said electric signal to compensate for near field measurements which are not the same as those assumed for far field measurements so that the acoustic output from said projector means and said zone cancel each other in the far field where the near field and far field are functions of the area of said zone and the highest frequency of interest to be cancelled; and D. circuit means for reducing the effects of acoustical feedback from said projector means to said means for measuring.

17. Apparatus for cancelling acoustic noise radiated by a surface, comprising an array of sound cancellation units each said unit including:

A. transducer means positioned adjacent said surface and operable to provide an output signal indicative of said acoustic noise generated by a predetermined zone of said surface;

B. projector means operable to provide an acoustic output signal in response to an input signal;

C. an active network responsive to said output signal of said transducer means for inverting, and modifying, as a function of frequency, the phase and gain characteristics, of said signal; and D. circuit means for cancelling that component of said output signal of said transducer means due to said transducer means detecting said acoustic output signal of said projector.

18. Apparatus for cancelling acoustic noise radiated by a surface, comprising an array of sound cancellation units each said unit including:

A. a plurality of accelerometer sensors mounted directly on said surface for providing an electrical signal indicative of said acoustic noise generated by a predetermined zone of said surface;

B. projector means operable to provide an acoustic output signal in response to an input signal;

C. a signal conditioning network for 180° phase shifting said output signal of said accelerometer sensors and for providing a modified signal to said projector means, and including an active filter for modifying, as a function of frequency, said output signal of said accelerometer sensors.

* * * * *